United States Patent [19]
Pinard et al.

[11] 4,291,281
[45] Sep. 22, 1981

[54] SINGLE MODE DOUBLE MICHELSON-TYPE LASER CAVITY RESONATOR

[75] Inventors: Michel Pinard, La Queue en Brie, France; Carl Aminoff, Helsinki, Finland; Gerard Trenec; Franck Laloë, both of Paris, France

[73] Assignee: Agence National de Valorization de la Recherche, Neuilly sur Seine, France

[21] Appl. No.: 939,710

[22] Filed: Sep. 5, 1978

[30] Foreign Application Priority Data

Sep. 2, 1977 [FR] France ............................ 77 26695

[51] Int. Cl.$^3$ ............................................. H01S 3/082
[52] U.S. Cl. ............................ 331/94.5 C; 331/94.5 D
[58] Field of Search .................... 331/94.5 C, 94.5 D; 356/346, 349, 352, 357, 358

[56] References Cited

PUBLICATIONS

"Characteristics of a Single-Frequency Michelson-Type He-Ne Gas Laser," by Di Domenico, Jr., IEEE Jour. of Quant. Elect., vol. QE-2, No. 8, (Aug. '66).

Primary Examiner—William L. Sikes
Assistant Examiner—Leon Scott, Jr.
Attorney, Agent, or Firm—Abraham A. Saffitz

[57] ABSTRACT

Cavity resonator arrangement for single mode laser. A double Michelson interferometer is substituted for one of the mirrors of a conventional Fabry-Perot interferometer. The positions of the three mirrors of this double Michelson interferometer are positioned with respect to the mirror limiting the cavity resonator through D.C. controlled piezoelectric shims.

3 Claims, 8 Drawing Figures

SINGLE MODE DOUBLE MICHELSON-TYPE LASER CAVITY RESONATOR

BACKGROUND OF THE INVENTION

1. Field of the Invention

The present invention concerns a new mode configuration of laser cavity resonator for producing a single frequency output from lasers.

Laser oscillators employing active media with inhomogeneously broadened gain profiles are inherently multimode devices. If $\Delta\nu_D$ is the linewidth of the active medium and L the mirror separation of the laser Fabry-Perot interferometer, then the number of discrete oscillation frequencies in a single transverse mode (i.e. longitudinal modes) is approximately given by $$N = \frac{2L}{c} \Delta\nu_D$$

in which c is the speed of light. For the 6328 Å He-Ne gas laser, L is typically 1.5 m and $\Delta\nu_D \approx 1600$ Mc/s, giving $N \approx 15$. Unless special techniques are employed to produce a phase-locked laser, each of the oscillating longitudinal modes will have fixed amplitude and random phase. The lack of phase correlation between modes will result in random intensity fluctuations in the output causing the laser to have excess photon noise. The desirability of having a single-frequency laser oscillator is evident then, both from the point of view of noise and from the point of view of eventual usefulness in communications systems. Such an oscillator would find application, for example, as a carrier source in a communications channel, or as a local oscillator in an optical heterodyne detector, as well as an ultra-narrow linewidth source for certain spectroscopic studies.

2. Description of the Prior Art

A number of passive mode filtering techniques are available for producing a single mode (i.e. a single frequency single transverse mode) oscillator.

In the article "Characteristics of a Single-Frequency Michelson-Type He-Ne Gas Laser" published in IEEE Journal of Quantum Electronics, Vol. QE-2, No. 8, August 1966, M. DIDOMENICO disclosed a single mode arrangement in the form of a modified Michelson interferometer. A schematic diagram of this Michelson type laser is shown in FIG. 1, from which it can be seen that the basic modification is the introduction of a common feedback mirror $M_c$ for coupling the two branches of the Michelson at the beam splitter BS. In the configuration shown, two long gain paths are used with small path length differences $\Delta L = L_1 - L_2$. The path length difference $\Delta L$ is responsible for the mode suppression properties of the device, and the two long gain paths allow one to achieve high single-mode power. The coincidences between resonances of the cavity formed by mirrors $M_1$ and $M_c$ and those of the cavity formed by mirrors $M_2$, BS and $M_c$ are found to be separated in frequency by $c/2\Delta L$. These coincident frequencies are the preferred resonances of the overall coupled system and correspond to the condition where zero energy is coupled out of the beam splitter. Mode discrimination at all other noncoincident frequencies comes about because energy is coupled out of the beam splitter with the result that the system becomes lossy at these frequencies.

The article of S. LIBERMAN and J. PINARD "Single Mode CW Dye Laser with Large Frequency Range Tunability" published in Applied Physics Letters, Vol. 24, No. 3, February 1974 disclosed a dye laser in which a Michelson interferometer is substituted for one of the mirrors of a Fabry-Perot interferometer.

In the lasers of these references, the separation between coincidences is found to be $$\Delta\nu = c/2\Delta L$$

instead of $\Delta\nu = c/2L$ for the separation between discrete adjacent oscillation frequencies in a single transverse mode laser oscillator. The passive transmission loss out of the beam splitter $T_q$ at a noncoincident frequency displaced from a coincident frequency by $qc/2L$ (q integer and $L = (L_1 + L_2)/2$ is (for 3-dB beam splitter):

$$T_q = \frac{4R^2 \sin^2(\pi q \Delta L/L)}{1 + 4R^2 \sin^2(\pi q \Delta L/L)} \text{ with } R = \tfrac{1}{2}$$

The term in the denominator is due to the fact that the laser active material is located along the two split branches of the Michelson interferometer and not in the common branch. If it were located in the common branch, the passive transmission loss out of the beam splitter would be $$T_q = 4R^2 \sin^2 \pi q(\Delta L/L) \tag{1}$$

where R is the reflectivity coefficient of the beam splitter ($R = \tfrac{1}{2}$ for a 3-dB beam splitter).

The coincident resonances take place for $q = 0$, $L/\Delta L$, $2L/\Delta L$, .... If $\Delta L/L$ is small (FIG. 2), the period between two adjacent coincidence resonances is large but the noncoincident adjacent modes are poorly attenuated. If $\Delta L/L$ is large (FIG. 3), the period between two adjacent coincidence resonances is small but the noncoincident adjacent modes are significantly attenuated.

In both cases, an interferometer of this nature requires an adjustment of the quantity $\Delta L$ having an accuracy and a stability exceeding that possible to achieve by mechanical means (as a result of thermal drift). This is why, as described in the above-mentioned reference to L. LIBERMAN et al., one of the Michelson interferometer mirrors is mounted on a piezoelectric shim, as well as, moreover, the laser's main mirror; these shims receive electric voltage from an automatic control device using an error signal obtained by comparison with a reference voltage.

Nonetheless, it can be difficult to render a laser single mode due to the only fact that a Michelson interferometer replaces one of its end reflectors. This is particularly true as regards a dye laser, i.e. a laser whose amplification medium is made up of organic molecules in solution, the fluorescence of which, when excited by another laser, is omitted over a very wide range typically of several hundred Angströms in wavelength. Experience has shown in actual fact that a dye laser equipped with an ordinary Michelson interferometer can only be made single mode at low powers.

U.S. Pat. No. 3,495,911 issued Feb. 17, 1970 to Robert D. DURAND et al., described an extended range interferometer illuminated by a multimode light source. Considering that multimode light sources suffer the disadvantage, for measuring distances with fringe counting interferometers, in that there is a periodic minimum in contrast and in discernability of the fringes as the distance increases over which the fringes are counted, it is proposed to illuminate two Michelson interferometers by the same multimode light source each interferometer having a reference path and a variable path and to direct the output beam of the two interferometers in the same direction towards two different photoreceivers. By properly positioning the paths associated with the two photoreceivers, the fringe visibility at one detector can be substantially at a maximum while the fringe visibility at the other detector can be at a minimum.

In the Durand's double interferometer, the two Michelson interferometers are illuminated by a multimode laser but do not form the cavity resonator of a single mode laser.

SUMMARY OF THE INVENTION

The invention concerns an arrangement of a cavity resonator for single mode laser comprising a laser active material in said cavity resonator, a first fully reflecting mirror on one side of said active material, a first beam splitter on the other side of said active material receiving the laser beam and splitting the same into first and second split beams, a second partially reflecting mirror in the first split beam path, a second beam splitter in the second split beam path, said second beam splitter receiving the second split beam and splitting the same into third and fourth split beams, a third fully reflecting mirror in the third split beam path, a fourth fully reflecting mirror in the fourth split beam path and common means for positioning the third and fourth mirrors along the third and fourth beam paths respectively.

Preferably, the second and third beams are aligned together, the second and third aligned split beams are perpendicular to the first split beam and define therewith a plane and the fourth split beam is perpendicular to said plane.

According to another feature of the invention, the mirrors are carried by mirror mountings through piezoelectric shims and the shims associated with the third and fourth mirrors are controlled by appropriate D.C. voltages in order to impart proportional displacements to said mirrors.

BRIEF DESCRIPTION OF THE DRAWINGS

The foregoing and other objects, features and advantages of the present invention will be apparent from the following more particular description of preferred embodiments of the invention as illustrated in the accompanying drawings, in which.

DESCRIPTION OF THE PREFERRED EMBODIMENTS

Figure 4A:
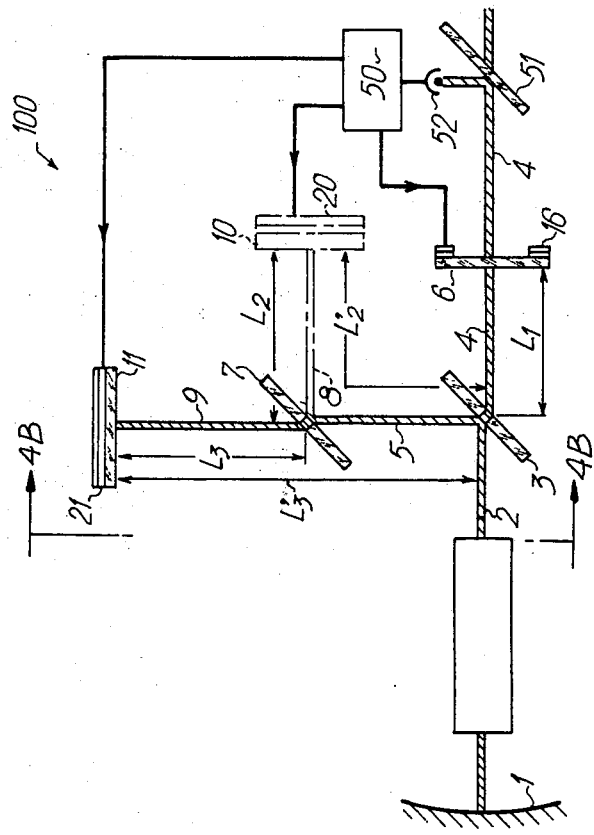
FIG. 4A and 4B together provide a representation of one embodiment of a double Michelson type laser cavity resonator in accordance with this invention, FIG. 4B being a view along the 4B—4B of FIG. 4A with phantom lines showing elements out of the plane.
Figure 4B:
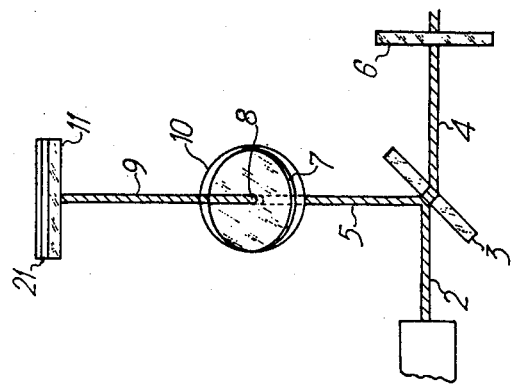

Referring now to FIGS. 4A and 4B, the laser cavity resonator 100 comprises mirror 1 and a double Michelson interferometer. This double Michelson interferometer includes a first beam splitter 3 which splits the incident beam 2 into two partial beams 4 and 5, partial beam 4 impinging on to mirror 6 and partial beam 5 impinging on to a second beam splitter 7. The second beam splitter 7 splits beam 5 into two partial beams 8 and 9, respectively reflecting on mirrors 10 and 11. Beams 2, 4, 5 and 9 are in a horizontal plane and beam splitter 7 and mirrors 6 and 11 are vertical whilst beam 8 is vertical and mirror 10 is horizontal. The normal to the parallel sided plate forming beam splitter 7 makes an angle of 45° with the vertical passing through its center. The difference of optical paths is $\Delta L_{21}=(L_2'-L_1)$ and $\Delta L_{31}=(L_3'-L_1)$ for the first Michelson interferometer and $\Delta L_{32}=(L_3-L_2)$ for the second Michelson interferometer.

If $\Delta L_{32}$ is an integer multiple of the wavelength of the laser wave, then the beams reflected by mirrors 10 and 11 arrive at beam splitter 7 in phase and the wave energy completely returns to 3. If they do not arrive in phase, then at least one part of the light energy is lost. If the beam reflected from 7 to 3 is in phase with that from 6 to 3, beam splitter 4 in its turn sends all the light energy towards mirror 1 at the other end of the laser; if they do not arrive in phase, at least one part of the light energy is also lost.

Figure 5A:
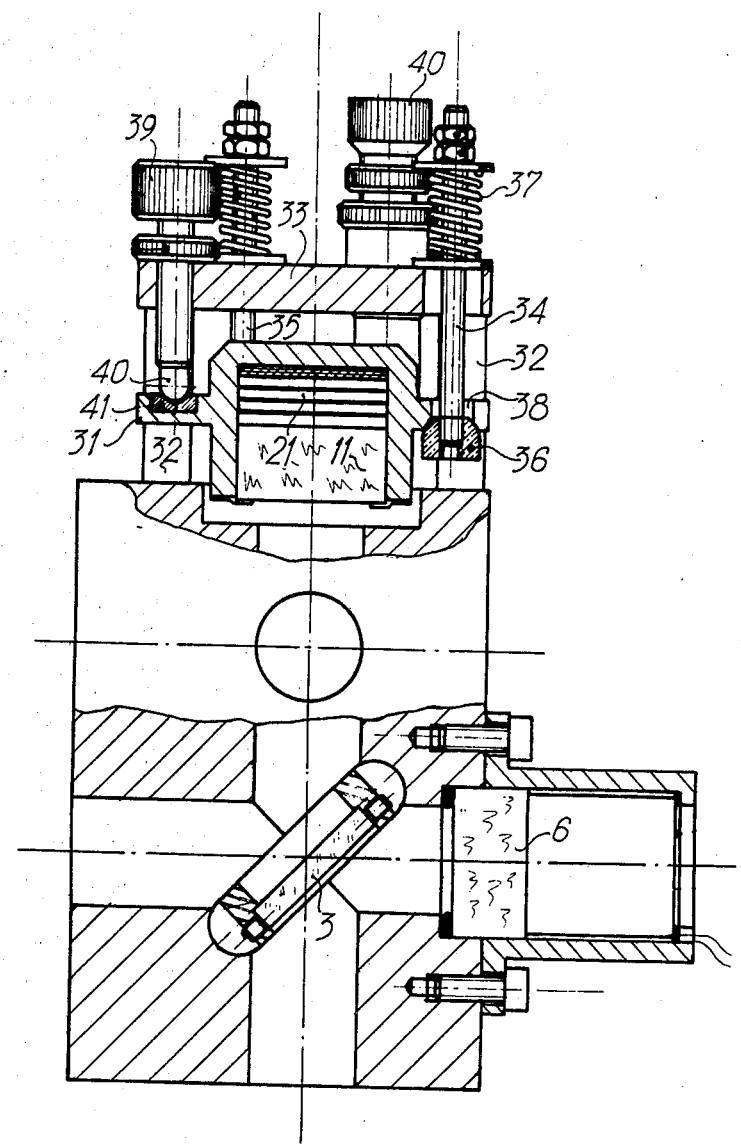
FIGS. 5A and 5B are an illustration of a rugged configuration utilizing the fundamental principles of FIG. 1.
Figure 5B:
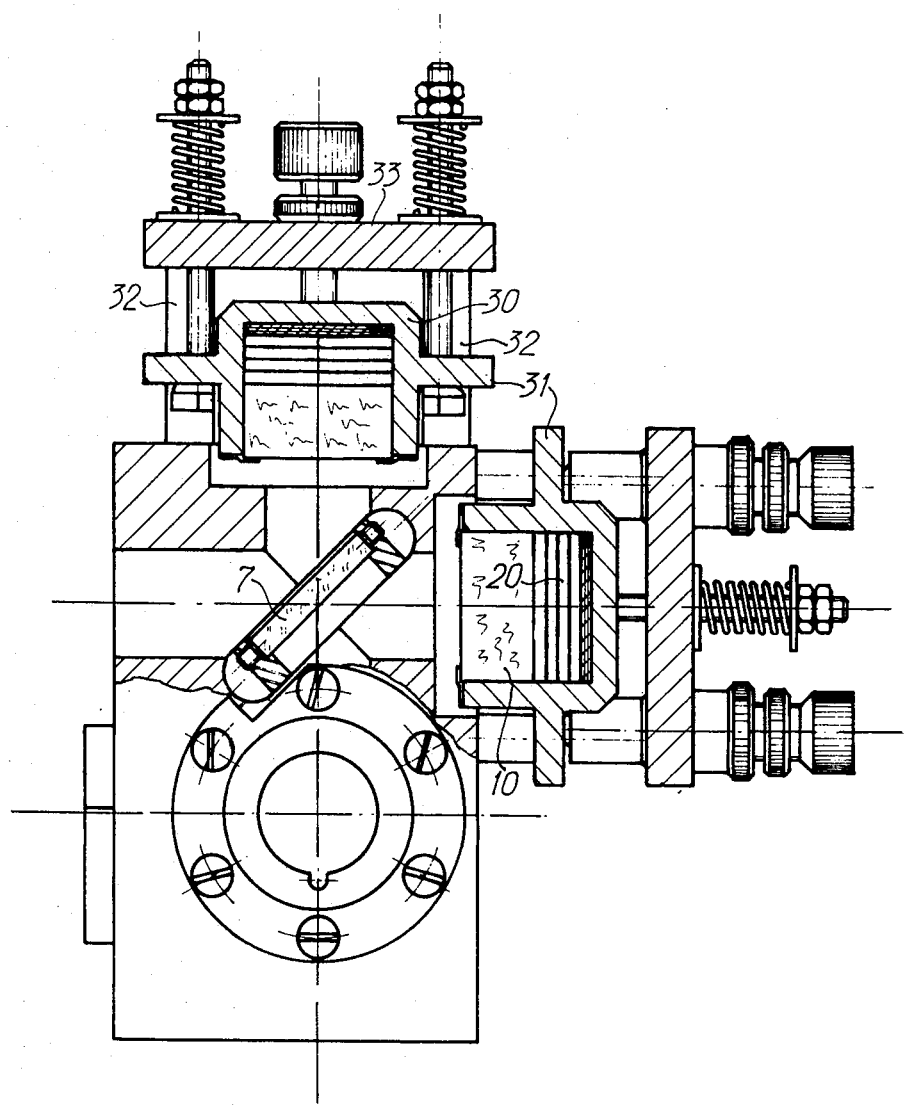

FIGS. 5A and 5B illustrate a potential implementation of the present invention in accordance with the conclusions drawn from FIGS. 4A and 4B in a relatively rigid and rugged structure.

In FIGS. 5A and 5B, beam splitters 3 and 7 come up again as do mirrors 6, 10 and 11 and the piezoelectric shims 20 and 21 associated with mirrors 10 and 11. Each mirror 10 or 11 is contained in a cup 30 in the bottom of which are located the piezoelectric shims with the mirror sitting on them. Cups 30 have an outside flange 31 which slides on mountings 32. These mountings support a plate 33. Two rods 34 and 35 with ball-joints 36 at the end and biased by springs 37 are mounted on this plate. These rods pass through holes 38 in flange 31 and these holes 38 act as wells for ball-joints 36. The spring rods thus pull the mirror-carrying cups outwards. A micrometer screw 39 is capped with a rounded head 40 which pushes up against a stop 41 housed in the flange. Finally, a differential stop control screw 42 makes it possible to tighten the flange between two stops.

For allowing the laser to oscillate at a determined frequency, the position of three mirrors must be adjusted with respect to a fourth with a very high degree of accuracy. For this purpose, these mirrors are located on piezoelectric shims 16, 20 and 21, the shims themselves being kept in position by the mechanical mountings (a coplanar adjustment device) with differential screws which have just been described. These shims are supplied with D.C. voltages from a feedback control device 50 of the type in the afore-mentioned reference to Liberman et al., with the difference that the slaving includes one loop extra.

If one of the mirrors, for example 6, acts as an output mirror, shim 16 (FIG. 4A) has the form of a ring; flux 4 which crosses it passes through its central hole. One part of this flux is reflected by a semi-transparent parallel sided plate 51 towards a photoreceiver 52 connected to device 50 which generates the voltages acting on shims 16, 20 and 21.

Let us assume that the active material is located in the portion of the cavity resonator comprised between mirror 1 and beam splitter 3. Then the passive transmission loss out of the non-coincident frequency displaced from a coincident frequency by qc/2L is $$T_q = 4TR^2 \sin^2 \pi q(\Delta L/L)_{21} + 4T^2R \sin^2\pi q(\Delta L/L)_{31} \quad (2)$$
$$+ 4TR^3 \sin^2\pi q(\Delta L/L)_{32}$$

where
$(\Delta L/L)_{21}$, $(\Delta L/L)_{31}$, $(\Delta L/L)_{32}$ have already been defined;
R complex amplitude reflexion coefficient;
T complex amplitude transmission coefficient.

It is to be noticed that $(\Delta L/L)_{32} = (\Delta L/L)_{31} - (\Delta L/L)_{21}$. Thus equation (2) contains two independent arguments $(\Delta L/L)_{31}$ and $(\Delta L/L)_{21}$.

Assuming that the beam splitters are 3-dB beam splitters, then $T = R = \frac{1}{2}$ and equation (2) becomes:

$$T_q = \tfrac{1}{2} \sin^2\pi q(\Delta L/L)_{21} + \tfrac{1}{2} \sin^2\pi q(\Delta L/L)_{31} \quad (3)$$
$$+ \tfrac{1}{4} \sin^2\pi q(\Delta L/L)_{32}$$

Equation (3) comprises a constant term $\tfrac{5}{8}$ and a cosine term. The cosine term is:

$$\tfrac{1}{4}[ \cos 2\pi q(\Delta L/L)_{21} + \cos 2\pi q(\Delta L/L)_{31} + \tfrac{1}{2} \cos 2\pi q(\Delta L/L)_{32}] \quad (4)$$

This term only contains cosines. Let us take $$(\Delta L/L)_{31} = p(\Delta L/L)_{21} = pe \quad (5)$$

Then $$(\Delta L/L)_{32} = (p-1)(\Delta L/L)_{21} = (p-1)e \quad (6)$$

and term (4) becomes:

$$\tfrac{1}{4}[ \cos p(2\pi q\, e) + \tfrac{1}{2} \cos (p-1)(2\pi q\, e) + \cos (2\pi q\, e)] \quad (7)$$

Figure 1:
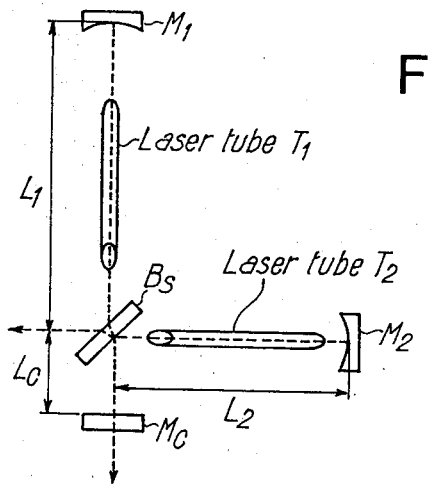
FIG. 1 is a simple representation of a prior art single mode Michelson type laser like that explained in the introductory part.
Figure 2:
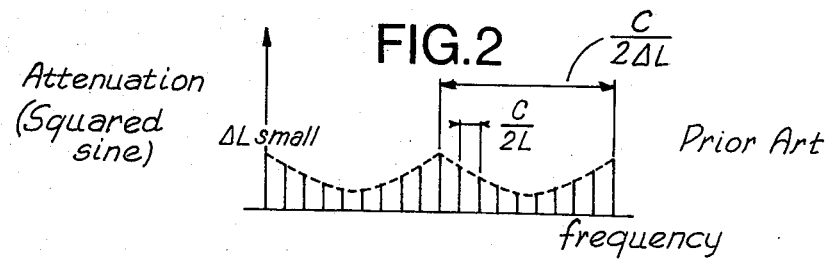
FIGS. 2 and 3 represent the mode spectrum of the prior art Michelson type laser of FIG. 1 and show the frequency separation between adjacent coincident reinforced modes and the attenuation of the noncoincident attenuated modes (these two figures were discussed in the introductory part)
Figure 3:
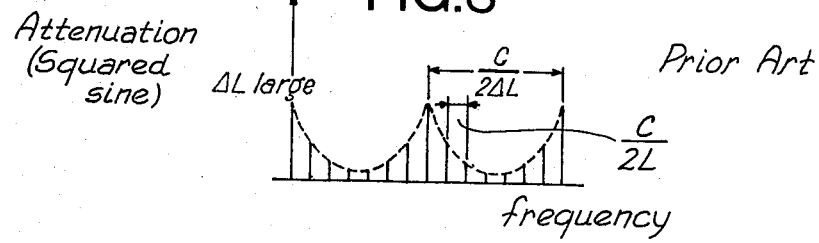
Figure 6:
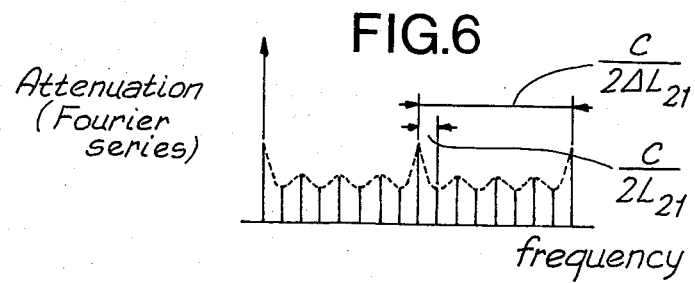
FIG. 6 represents the mode spectrum of the double Michelson type laser of FIG. 4.

It is a three term Fourier series shown in FIG. 6 where the argument is $(2\pi q\, e)$ which contains the fundamental and its harmonics of order p and (p−1). The attenuation factor between two coincident frequencies is no longer a squared sine of the frequency but a Fourier series of the frequency. For a given spacing between two coincident frequencies, the attenuation of the non coincident frequencies is greater in FIG. 6 than in FIGS. 2 and 3.

The factor p is determined by experience. In practice, it lies between 3 and 30. In a dye laser fitted with a Lyot filter in which the output mirror has been replaced by a mode selector of the type in FIG. 4, we have taken:

$$(\Delta L/L)_{31} = 10(\Delta L/L)_{21}$$

The number of Michelson interferometers in series can be increased. A third beam splitter can, for example, be placed on beam 9. A system is thus obtained having 4 mirrors I, II, III and IV and 3 beam splitters. The expression for $T_q$ therefore has six terms in ($\sin^2$) introducing $(\Delta L/L)_{12}$, $(\Delta L/L)_{13}$, $(\Delta L/L)_{14}$, $(\Delta L/L)_{23}$, $(\Delta L/L)_{24}$ and $(\Delta L/L)_{34}$ three of which are independent and a six-term Fourier series whose coefficients are the quantities $TR^2$, $T^2R^2$, $T^3R$, $TR^3$, $T^2R^3$, $T^3R^3$.

Since the parameters $(\Delta L/L)_{31}$, $(\Delta L/L)_{32}$ are multiple of $(\Delta L/L)_{21}$, the piezoelectric shims 16, 20 and 21 can be controlled by voltage multiple of one another derived from the control current supplied by photoreceiver 52 through a voltage divider (assuming that the prezoelectric material is within its linear range). In the example of formulas (5) and (6), the control voltage would be V for piezoelectric shim 16, 2 V for piezoelectric shim 20 and (p+1) V for piezoelectric shim 21.

In the foregoing, it was assumed that the double interferometer is of the Michelson type. It can also be of the Fox-Smith type. By rotating through 90° the beam splitter 7 in FIG. 4, one obtains a composite Michelson and Fox-Smith double interferometer. In the calculation $(L_2 - L_3)$ must be replaced by $(L_2 + L_3)$.

We claim:

1. Cavity resonator arrangement for a single mode laser comprising:
   means for producing and emitting a laser beam, said means including:
   a cavity resonator;
   a laser active material in said cavity resonator;
   pumping means for activating said laser active material;
   energy abstracting means; said cavity resonator comprising:
   a first fully reflecting mirror on one side of said active material;
   a first beam splitter means on the other side of said active material receiving said laser beam and splitting the same into first and second split beams directed along first and second split beam paths respectively perpendicular to each other said first and second beam paths and defining a reference plane;
   a partially reflecting mirror in the first split beam path;
   a second beam splitter means in the second split beam path, said second beam splitter means receiving said second split beam and splitting the same into a third split beam aligned with said second beam and a fourth split beam perpendicular to the reference plane, said third and fourth split beams being directed along third and fourth split beam paths;
   a second fully reflecting mirror in the third split beam path;
   a third fully reflecting mirror in the fourth split beam path; and
   piezoelectric means for positioning the second and third mirrors along the third and fourth beam paths respectively.

2. Cavity resonator arrangement for single mode laser comprising:
   means for producing and emitting a laser beam, said means including:
   a cavity resonator;
   a laser active material in said cavity resonator;
   pumping means for activating said laser active material;
   energy abstracting means;
   said cavity resonator comprising:

a first fully reflecting mirror on one side of said active material;

a first beam splitter means on the other side of said active material receiving said laser beam and splitting the same into first and second split beams directed along first and second split beam paths;

a partially reflecting mirror in the first split beam paths;

a second beam splitter means in the second split beam path, said second beam splitter means receiving said second split beam and splitting the same into third and fourth split beams directed along third and fourth split beam paths;

a second fully reflecting mirror in the third split beam path;

a third fully reflecting mirror in the fourth split beam path;

mountings for said partially reflecting mirror and second and third fully reflecting mirrors;

piezoelectric shims located in said mountings for positioning the mirror according to direct current control signals applied thereto; and a photoreceiver receiving said first split beam and means for deriving from said photoreceiver current said direct current control signals.

3. Cavity resonator arrangement according to claim 2, in which the piezoelectric shim located in the mounting for the partially reflecting mirror is ring shaped and the first split beam is the outgoing beam from the single mode laser and passes through said ring.

* * * * *